United States Patent [19]

Wade

[11] 3,914,984

[45] Oct. 28, 1975

[54] SYSTEM FOR MEASURING SOLIDS AND/OR IMMISCIBLE LIQUIDS IN LIQUIDS

[76] Inventor: Richard A. Wade, 141 W. Lake Shore Drive, Tower Lake, Barrington, Ill. 60010

[22] Filed: May 8, 1972

[21] Appl. No.: 251,227

[52] U.S. Cl. ............ 73/61 R; 73/61.1 R; 73/67.5 R
[51] Int. Cl.² .......................................... G01N 15/06
[58] Field of Search ............ 73/61, 61.1, 67.5, 67.6, 73/67.9, 61 R, 61.1 R, 67.5 R, 32 A

[56] References Cited
UNITED STATES PATENTS

| | | | |
|---|---|---|---|
| 2,926,522 | 3/1960 | Kritz | 73/32 R |
| 3,359,788 | 12/1967 | Colvin | 73/61.1 R |
| 3,427,867 | 2/1969 | Nute et al. | 73/67.9 |
| 3,487,697 | 1/1970 | Epstein | 73/67.7 X |
| 3,538,752 | 11/1970 | Weinbaum | 73/67.9 |
| 3,710,615 | 1/1973 | Johnson et al. | 73/67.7 |
| 3,791,200 | 2/1974 | Hayre | 73/67.1 |

*Primary Examiner*—Richard C. Queisser
*Assistant Examiner*—Stephen A. Kreitman
*Attorney, Agent, or Firm*—George H. Gerstman

[57] ABSTRACT

A system is provided for measuring solids and/or immiscible liquids in liquids. A series of ultrasonic pulses is transmitted into a sample chamber and means are provided for receiving the root signal of each of the ultrasonic pulses and its reflected echo signals. Each root signal and its measurable reflected echo signals form a pulse train. Only a selected one of the reflected echo signals from each pulse train is detected and a signal corresponding to the selected one signal is displayed.

6 Claims, 2 Drawing Figures

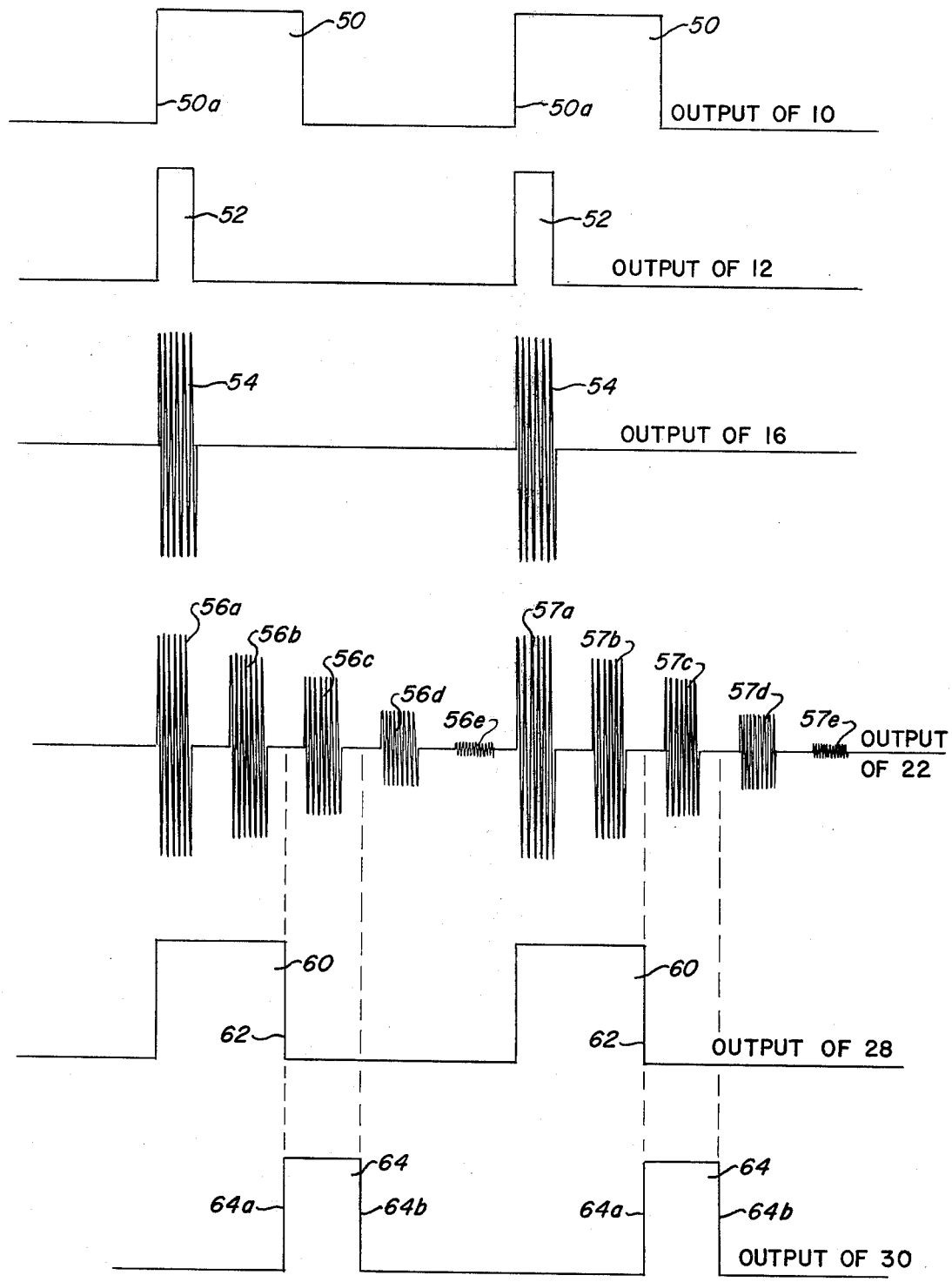

SYSTEM FOR MEASURING SOLIDS AND/OR IMMISCIBLE LIQUIDS IN LIQUIDS

BACKGROUND OF THE INVENTION

This invention relates to apparatus for measuring solids and/or immiscible liquids in liquids.

There are several prior art systems for detecting the percentage of solids in liquids. In the gravimetric type of prior art system, the sample of solids and liquid is filtered and the solids remaining on the filter are weighed. However, the gravimetric type of analysis is difficult because it generally requires the steps of weighing, filtering, evaporating, weighing and calculating. Density gauge types of solids measurement systems have been utilized, but to use a density system you must have some specific gravity difference between the solids and the liquid. Another type of system utilizes timed pulses which are passed through the slurry, and the value of all of the signals received at a spaced portion of the slurry is collected and displayed. This system has been found to be inaccurate in many applications.

I have discovered a system for measuring solids and/or immiscible liquids in liquids which is simpler and more accurate than prior art systems and which operates essentially by detecting phase interfaces. My system is substantially unaffected by side variables that plague other systems. For example, changes in liquid composition, provided that the liquid components are miscible, have a negligible effect. The liquid system may be composed of several miscible components and the ratio of these components may change without interfering with the solids measurement. Further, changes in the temperature of the liquid, except if very substantial, do not affect the operation of my system. Nor are other factors which affect the speed of sound through the liquid sample detrimental to accuracy.

Some of the many uses to which my invention is applicable include determining the solids concentration of: paper pulp slurries, crystals in their mother liquor, latex suspensions, precipitates, suspension polymerization particles, mining fines, fibrous and particulate foodstuffs, contaminants in cutting and lubricating fluids, and many types of sols, colloids, emulsions and suspensions. Since my system detects phase interfaces, measurements can be made with respect to an immiscible liquid in another liquid, as well as measurements of solids in liquids.

BRIEF DESCRIPTION OF THE INVENTION

In accordance with the present invention, there is provided apparatus for measuring solids and/or immiscible liquids in liquids. Means are provided for producing a series of ultrasonic pulses. A transducer is provided for transmitting the ultrasonic pulses into a sample to be tested. In one embodiment of the invention, the apparatus comprises a chamber for containing a sample to be tested. However, the sample to be tested could be any unenclosed body of liquid.

Means are spaced from the transducer for receiving the root signal of each of the ultrasonic pulses and its reflected echo signals, with each root signal and its measurable reflected echo signals forming a pulse train. The transmitted ultrasonic pulses are spaced apart a greater length of time than the total time of the pulse train. Means are provided for detecting only a selected one of the reflected echo signals from each pulse train, and means are provided for displaying a signal corresponding to the selected one signal.

In one embodiment of the invention, the detecting means comprises a peak detector. Means are provided for amplifying and transmitting the pulse trains received by the receiving means to the peak detector. Means are provided for preventing other than the selected one echo signal of each train from being detected by the peak detector. Means are further provided for modifying and coupling the output of the peak detector to the displaying means.

A more detailed explanation of the invention is provided in the following description and claims, and is illustrated in the accompanying drawings.

BRIEF DESCRIPTION OF THE DRAWINGS

FIG. 2 is a voltage versus time chart showing the voltages at various portions of the circuit of FIG. 1 at selected times.

DETAILED DESCRIPTION OF THE ILLUSTRATIVE EMBODIMENT

Figure 1:
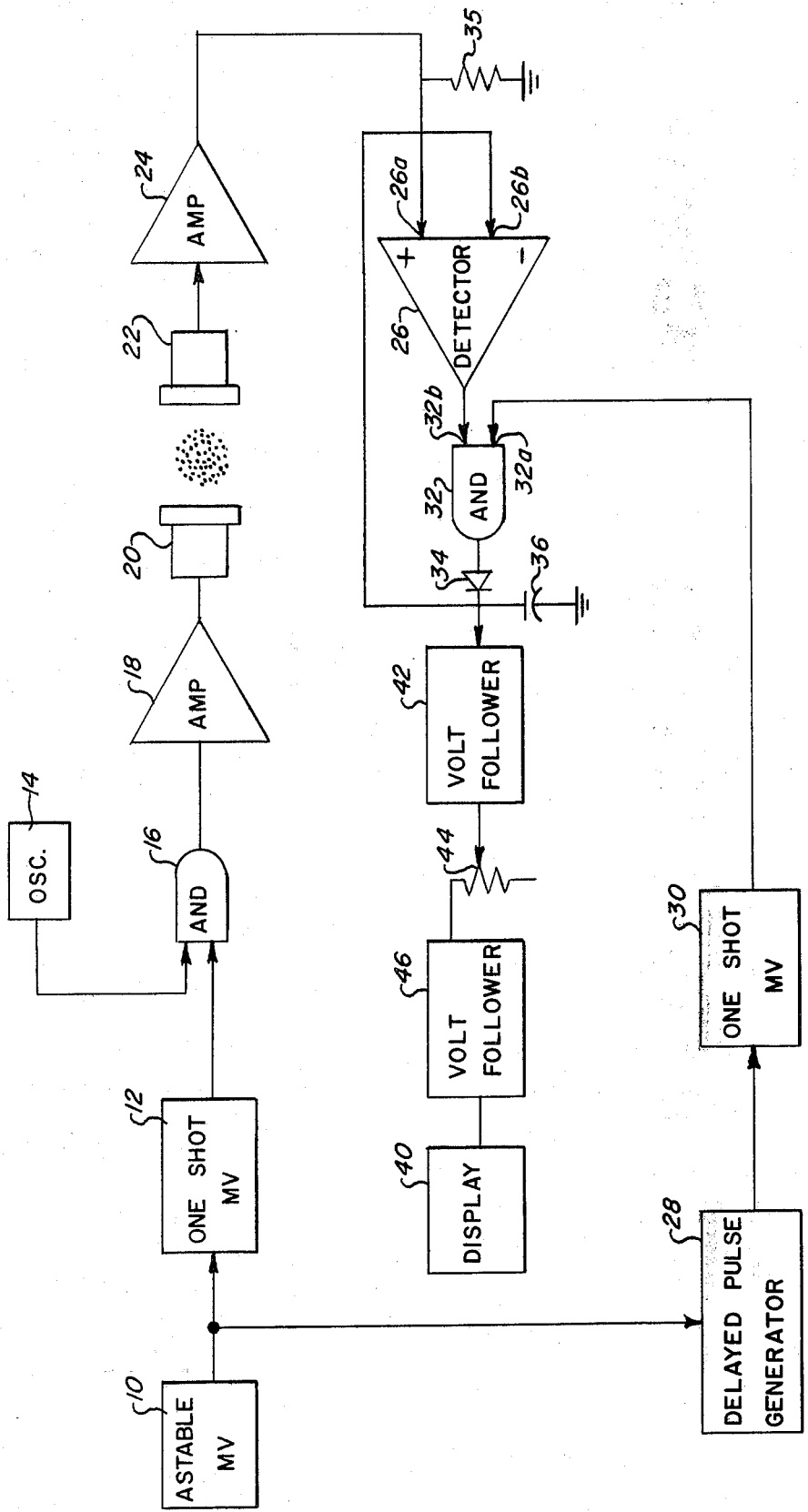
FIG. 1 is a block circuit diagram of apparatus in accordance with the principles of the present invention, for measuring solids and/or immiscible liquids in liquids.

The principle of operation of the present invention is to transmit a series of ultrasonic pulses into a test sample. The root signal of each of the pulses and its reflected echo signals are received at another part of the sample. Solid particles in the liquid absorb and scatter the ultrasonic waves in proportion to their concentration. As the percentage of solids increases, a smaller signal is detected by the receiving transducer. As is discussed below, only a selected one of the reflected echo signals from each pulse train is detected and displayed.

Referring to FIG. 1, the system includes an astable multivibrator 10 which produces pulses at a predetermined rate. The leading edge of each of the pulses from astable multivibrator 10 triggers a one-shot multivibrator 12 which produces a much narrower pulse. The output of one-shot multivibrator 12 and the output of a high frequency oscillator 14 is fed to an AND gate 16 to thereby frequency-modulate the one-shot multivibrator pulse. The frequency-modulated pulse is amplified by amplifier 18 and fed to a crystal transducer 20 which is positioned on one side of a sample chamber. Crystal transducer 20 comprises a piezoelectric transducer which sends a pulse through the sample chamber to a similar crystal transducer 22 which faces transducer 20 on the opposite side of the chamber. The pulses received by transducer 22 are amplified by amplifier 24 and fed to an input 26a of peak detector 26.

The leading edge of the pulses from astable multivibrator 10 also trigger a delayed pulse generator 28 which produces pulses at a predetermined rate. The lagging edges of the pulses produced by delayed pulse generator 28 trigger a one-shot multivibrator 30 which produces narrower pulses and which pulses are fed to an input 32a of AND gate 32. The output of peak detector 26 is fed to the other input 32b of AND gate 32 and through high-speed diode 34. The output of the high-speed diode 34 is fed back to the negative input 26b of peak detector 26. A resistor 35 is connected between positive input 26a and ground to provide a reference to ground for detector 26.

The output of peak detector 26 is also fed through high-speed diode 34 to charge capacitor 36. Capacitor 36 holds the peak voltage and a corresponding signal is displayed on display 40. Display means 40, which could take the form of an analog meter or a digital readout, is coupled to the capacitor 36 - diode 34 junction through a voltage follower 42 which provides a high fixed impedance to isolate the peak detector, a zero adjust 44 and a voltage follower 46 which provides a high fixed impedance to isolate the zero adjust.

To most clearly understand the operation of the system, reference is made to the voltage versus time diagrams of FIG. 2, which are not to scale. As shown in FIG. 2, square pulses 50 produced by astable multivibrator 10 trigger narrower rectangular pulses 52 produced by one-shot multivibrator 12. Pulses 52 are frequency-modulated by oscillator 14 and exit AND gate 16 as pulses 54 which are amplified and transmitted through the sample chamber by transducer 20. Depending upon the type of solids concentration, the pulses transmitted by transducer 20 will be received by receiving transducer 22 as a pulse train 56a to 56e, then 57a to 57e, etc., with each pulse train comprising a root signal designated with the letter a and reflected echo signals designated with the letters b, c, d, e, etc. The astable multivibrator 10 is adjusted so that pulses 50 will be spaced in a manner whereby pulses 54 are spaced apart a greater length of time than the total decay time of a pulse train. In this manner, root signal 56a and all of its measurable reflected echo signals will be received by transducer 22 prior to reception of root signal 57a.

It has been found that the desired accuracy of measurement can be achieved when only a selected one of the reflected echo signals of each train is displayed. To this end, the leading edge 50a of pulse 50 triggers delayed pulse generator 28 to produce pulses 60. Delayed pulse generator 28 is adjusted so that the lagging edges 62 of pulse 60 will trigger one-shot multivibrator 30 just prior to reception of the selected reflected echo signal. Thus leading edge 64a of pulse 64 produced by one-shot multivibrator 12 will be timed just prior to reception of the selected reflected echo signal and lagging edge 64b of pulse 64 will be in time just subsequent to reception of the selected reflected echo signal. It can be seen that the second reflected echo signal 56c, 57c, of each train was selected and leading edge 64a is in time between first reflected echo signal 56b and second selected reflected echo signal 56c while lagging edge 64b is in time after selected reflected echo signal 56c and before the third reflected echo signal 56d.

Pulses 64 are fed to input 32a of AND gate 32 while the output of peak detector 26 is fed to the other input 32b of AND gate 32. The output of AND gate 32 is fed to the high-speed diode 34. The output of high-speed diode 34 is fed to the negative input 26b of peak detector 26, to capacitor 36 and to voltage follower 42.

Peak detector 26 operates in the following manner. As the voltage into the peak detector is high, the peak detector emits a high voltage level signal to charge capacitor 36. Such charge continues until the voltage level at negative input 26b, as determined by the voltage on capacitor 36, is equal to the voltage at the positive input 26a of peak detector 26. When the input signal into input 26a drops below the voltage level at negative input 26b, as determined by the voltage on capacitor 36, the voltage on capacitor 36 holds due to diode 34. Thus capacitor 36 holds the peak voltage and displays it on display means 40. In effect, the peak is detected only when AND gate 32 receives pulses 64 and the signal level on positive input 26a of detector 26 is higher than the voltage on capacitor 36 and negative input terminal 26b of peak detector 26. This will occur only during transmission of the selected reflected echo pulse to the positive input terminal 26a of detector 26. The peak is displayed continuously because the charge on capacitor 36 is held by the diode 34 and the high impedances of the voltage follower 42 and the peak detector 26.

The length of pulses 50 and 52 are selected in accordance with the distance between transducers 20 and 22, and the approximate speed of sound through the liquid (i.e., the time required for a sound wave to travel through the liquid). In a specific embodiment of the invention, the transducers 20 and 22 were spaced apart 4 inches. The spacing must be far enough apart to prevent standing waves from building up in the sample chamber. Thus the trailing edge of the pulse has to clear the sending transducer 20 before the leading edge of the pulse is received by the receiving transducer 22. Additionally, it is necessary to have enough pulses to identify the frequency.

In a specific embodiment, pulses 50 were square with the time between their leading edges 50a being 3.5 milliseconds. It is preferred that the time between leading edges 50a of pulses 50 be between 2 and 8 milliseconds. In a specific embodiment, pulses 52 had a width of 70 microseconds and oscillator 14 provided a 2.5 megahertz frequency modulation. Although gated oscillator 14 can operatively provide a frequency of between 100 kilohertz and 10 megahertz, it is preferred that the frequency be between 1.0 megahertz and 3.5 megahertz. It is further preferred that at least 100 pulses 50 be produced by multivibrator 10 for proper accuracy.

It is preferable to provide a crystal oscillator 14 so that it can operate at a very stable frequency. I have found that although various piezoelectric transducers could be used, transducers 20 and 22 are preferably lead metaniobate or lead zirconate titanate, both of which have a low Q and do not ring. It is also important that the peak detector (comparator) 26 be of a high speed, such as 60 megahertz. It is to be understood that the foregoing specific parameters and the following specific parameters are for illustrative purposes only, that no limitation is intended, and that other components may be used in connection with the block diagram illustrated in FIG. 1:

| Circuit Elements | Integrated Circuit Model No. |
| --- | --- |
| Astable multivibrator 10 | Fairchild 710C |
| One-shot multivibrator 12 | Fairchild 710C |
| Oscillator 14 | Fairchild 710C |
| Amplifiers 18, 24 | Fairchild 733C |
| Peak detector 26 | Fairchild 760C |
| AND gate 32 | Fairchild SH3002 |
| Delayed pulse generator 28 | Fairchild 9601 |
| One-shot multivibrator 30 | Fairchild 9601 |
| Voltage followers 42, 46 | Fairchild 741 |

A system has been provided for quick, repetitive measurements of the percentage of solid material in a liquid or the percentage of an immiscible liquid in a liquid. Although an illustrative embodiment has been shown and described, it is to be understood that various modifications and substitutions may be made by those skilled in the art without departing from the novel spirit and scope of the present invention.

What is claimed is:

1. Apparatus for measuring the concentration of suspended solids and/or immiscible liquids in liquids, which comprises: means for producing a series of ultrasonic pulses; a transducer for transmitting said ultrasonic pulses into a sample to be tested; means spaced from said transducer for receiving the root signal of each of said ultrasonic pulses and its reflected echo signals with each root signal and its measurable reflected echo signals forming a pulse train, said transmitted ultrasonic pulses being spaced apart a greater length of time than the total time of a said pulse train; means for detecting only a selected one of said reflected echo signals from each pulse train; and means for displaying a signal corresponding to said selected one signal, said producing means comprises means for producing a series of square pulses; a one-shot multivibrator triggering on the leading edge of each square pulse for producing a series of narrower rectangular pulses; a crystal oscillator for frequency modulating said rectangular pulses; and means for amplifying said modulated pulses and transmitting them to said transducer.

2. Apparatus as described in claim 1, said detecting means comprising a peak detector, means for amplifying and transmitting the pulse trains received by said receiving means to said peak detector; means triggered by said square pulse producing means for preventing other than said selected one echo signal of each train from being detected by said peak detector; and means for holding the peak detector output signal, said holding means being coupled to said displaying means.

3. Apparatus as described in claim 1, wherein the output of said peak detector is connected to charge a capacitor through a high-speed diode; and means coupled to the diode and capacitor junction for modifying the output signal thereat and for transmitting a signal to said displaying means.

4. Apparatus for measuring solids and/or immiscible liquids in liquids, which comprises: means for producing a series of ultrasonic pulses; a transducer for transmitting said ultrasonic pulses into a sample to be tested; means spaced from said transducer for receiving the root signal of each of said ultrasonic pulses and its reflected echo signals with each root signal and its measurable reflected echo signals forming a pulse train, said transmitted ultrasonic pulses being spaced apart a greater length of time than the total time of a said pulse train; means for detecting only a selected one of said reflected echo signals from each pulse train; and means for displaying a signal corresponding to said selected one signal; said detecting means comprising a peak detector, means for amplifying and transmitting the pulse trains received by said receiving means to said peak detector; means for preventing other than said selected one echo signal of each train from being detected by said peak detector; and means for modifying and coupling the output of said peak detector to said displaying means.

5. Apparatus as described in claim 4, wherein the output of said peak detector is connected to charge a capacitor through a high-speed diode; and means coupled to the diode and capacitor junction for modifying the output signal thereat and for transmitting a signal to said displaying means.

6. Apparatus for measuring the concentration of suspended solids and/or immiscible liquids in liquids, which comprises: a chamber for containing a sample to be measured; means for producing a series of ultrasonic pulses; a transducer for transmitting said ultrasonic pulses into said chamber; means spaced from said transducer for receiving the root signal of each of said ultrasonic pulses and its reflected echo signals with each root signal and its measurable reflected echo signals forming a pulse train; said transmitted ultrasonic pulses being spaced apart a greater length of time than the total time of a said pulse train; means for detecting only a selected one of said reflected echo signals from each pulse train; and means for displaying a signal corresponding to said selected one signal, said transducer and said receiving means being located to face each other on opposite sides of said chamber.

* * * * *